United States Patent [19]
Agrest

[11] 3,718,122
[45] Feb. 27, 1973

[54] FIRING CHAMBER FOR THE COMBUSTION OF GASEOUS, LIQUID OR FINE-GRANULAR FUEL

[76] Inventor: Jacobo Agrest, Avda. Belgrano 355, Buenos Aires, Argentina

[22] Filed: March 15, 1971

[21] Appl. No.: 123,948

[30] Foreign Application Priority Data

March 30, 1970 Argentina..............................227746

[52] U.S. Cl..................................110/149, 431/173
[51] Int. Cl...............................................F22b 7/12
[58] Field of Search......110/28 F; 431/173; 122/136, 122/149

[56] References Cited

UNITED STATES PATENTS

| | | | |
|---|---|---|---|
| 1,618,808 | 2/1927 | Burg | 431/173 |
| 2,654,350 | 10/1953 | Fitzpatrick | 110/28 F |
| 1,751,534 | 3/1930 | Taylor | 122/136 C |
| 1,946,011 | 2/1934 | Burg | 110/28 F |
| 2,748,754 | 6/1956 | Lotz | 110/28 F |
| 2,855,873 | 10/1958 | Swietochowski | 110/28 F |
| 3,339,613 | 9/1967 | Saha | 431/173 |

*Primary Examiner*—Kenneth W. Sprague
*Attorney*—Curt M. Avery, Arthur E. Wilfond, Herbert L. Lerner and Daniel J. Tick

[57] ABSTRACT

A combustion vessel structure for the combustion of fluid, i.e., gaseous, liquid or fine-granular fuel, preferably for steam generators, has its supply lines for fuel and for a partial amount of the combustion air located on one axial end side of a substantially cylindrical combustion chamber so that during operation a whirling or tornado flow is maintained in the combustion chamber. A gas outlet for the waste air is located at the opposite end side of the combustion chamber so that the combusted air is discharged under utilization of forces occurring in the tornado flow. An inner wall of wavy configuration extends axially through the combustion chamber. Further nozzles for the supply of additional combustion air enter tangentially into the troughs of the waves. The nozzle outlets for the additional air are disposed near the bottoms of the waves and terminate at most at the height of the wave crests.

7 Claims, 4 Drawing Figures

FIRING CHAMBER FOR THE COMBUSTION OF GASEOUS, LIQUID OR FINE-GRANULAR FUEL

My invention relates to a chamber or vessel structure for the combustion of fluid, i.e., gaseous, liquid or fine-granular fuel, particularly for steam generators. More specifically, the invention deals with combustion chamber structures whose combustion chamber proper is approximately cylindrical, the supply of the fuel and of at least a portion of the combustion air entering into one end side of the cylindrical combustion chamber, whereas the waste-gas outlet is located in the opposite end side so that the exit of the waste air utilizes forces stemming from the tornado flow.

A prerequisite for a high efficiency of a fuel chamber is a complete combustion of the fuel with a minimum of soot or ash formation. This requires a good intimate mixing of fuel and combustion air. In the conventional fuel chambers, the combustion air is entirely, or subdivided into component flows, blown with or without turbulence axially into the combustion chamber and in the same flow direction as the fuel. In such an arrangement, each twist impressed upon the combustion air is rapidly lost because this twist declines in inverse proportion to the square of the distance from the burner point. This has the effect that the dwell time of the fuel particles is too slight for a complete burning and that the user is forced to operate with high excesses of air and with a correspondingly reduced efficiency, without in this manner reducing the resulting soot. The occurrence of such carbohydride residues, which are most difficult to combust and which occur in zones with the least amount of combustion oxygen, demands a particular expedient for the removal of the precipitated soot. This, however, leads to a discrepancy between the requirement for keeping the air as clean as possible, on the one hand, and the high efficiency and high energy of the combustion chamber, on the other hand.

It is therefore an object of my invention to devise a combustion chamber which, by means of simple expedients, affords a complete combustion of the supplied fuel together with a minimum of soot deposition.

To this end, and in accordance with a feature of my invention, I provide the combustion chamber with a wavy or corrugated inner wall, the waving extending in the axial direction. I further provide in the valleys of the waves respective tangentially entering nozzles for the supply of further combustion air. The outlets of these nozzles are located near the bottoms of the valleys, and the height of the nozzles ends at most at the height of the wave crests.

Due to the wave shape of the cylindrical combustion chamber there occur tornado flow paths for the combustion between the waves, whereby a particularly good intermixing and complete combustion is attained. By virtue of the approximately isothermic combustion in this case, there is secured a very uniform temperature along the entire length of the combustion chamber. This results in increasing the efficiency by the complete burning out of the fuel and a better evaporation when employing this firing chamber in the steam generator.

With the wave-shaped design of the inner wall it may be advisable to have the waves in the inner wall extend helically in one or more closed drafts. In this case, the combustion air nozzles extend from several tube lines disposed parallel to the firing chamber and on the external side thereof, these tube lines being connected to a ring channel concentrically surrounding the burner. Since the combustion air in this ring channel is driven by the firing fan, the use of a corresponding pressure for this fan makes it unnecessary to arrange an exhaust fan downstream of the firing chamber.

The described firing chamber is particularly well suitable for gaseous or liquid fuels but can also be used for pulverulent fuels. In the latter case it is advisable if in the vicinity of the burner a supply line tangentially entering into the firing chamber is also provided for relatively coarsely grained solid fuels. For increasing the extent of burning, particularly in the rear portion of the firing chamber, additional air supply nozzles may be arranged in concentric relation to the waste-gas outlet in the end face which terminates the firing chamber.

The described firing chamber is especially well applicable for steam generators of relatively small unit power rating, affording caloric efficiencies heretofore feasible only in units of larger dimensions.

Preferably, the firing chamber is built into a steam generator with smoke or flue tubes of the prone type, the burning chamber being surrounded eccentrically by a cylindrical pressure water boiler and provided with a smoke gas direction changing chamber for feeding the smoke gas tubes of the second boiler section which extends from the firing chamber and passes through the water boiler along its entire length. This boiler design preferably has another gas direction changing chamber on the burner side for directing the smoke gases from the smoke gas tubes of the second into the corresponding tubes of the third boiler section, a waste gas chimney being provided at the end of the third boiler section. The air supply lines extend within the pressure boiler and are surrounded by water so that a preheating of the additional combustion air is secured.

The above-mentioned and further objects, advantages and features of my invention, said features being set forth with particularity in the claims annexed hereto, will be apparent from the design and functioning of an embodiment according to the present invention illustrated by way of example on the accompanying drawings, in which:

Figure 4:
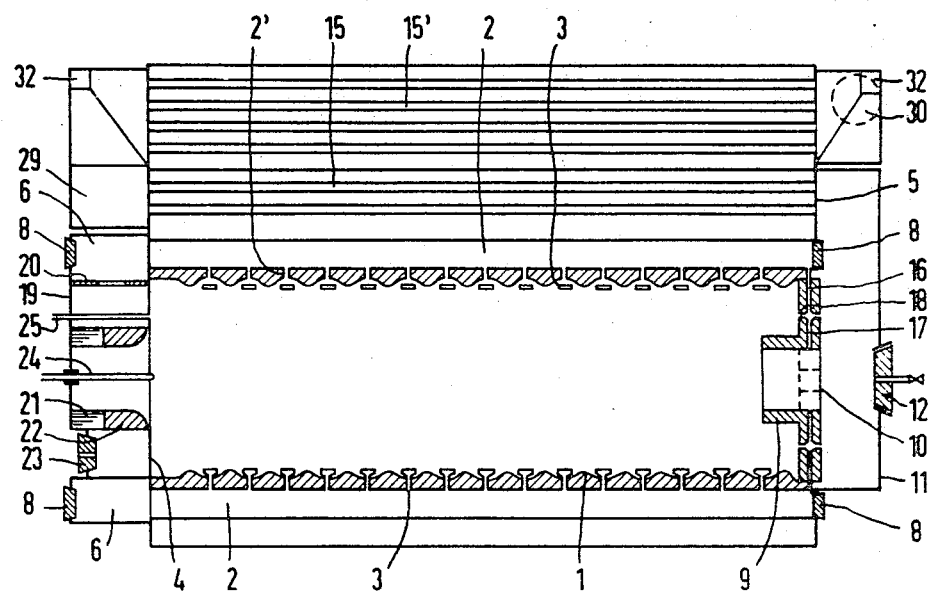
FIG. 4 is a longitudinal section of the boiler along the line IV—IV in FIG. 2.

In the illustrated embodiment, the firing chamber according to the invention is integrated into a smoke flue boiler. As will be seen from FIG. 1, the steam boiler comprises a cylindrical housing 35 with a circular end face 19 and a supporting bearing structure 19'. As shown in FIGS. 2 and 4, a firing chamber 1 with a wavy inner wall is arranged in eccentric relation to the housing 35 and is terminated by a frontal end plate 4 and a rear end plate 5. The steam generator comprises a group of smoke tubes 15 in the second stage and a tube group 15' in the third stage. The tubes do not protrude above the upper water level 15" of the boiler 35.

The rear end wall 5 serves also as bottom for the smoke tubes 15 of the second stage and for receiving the waste gas outlet 9. Located behind the rear end wall 5 is a reversing chamber 11 and an exit chamber 30 for the smoke gases. The smoke stack (not illustrated) extends from the exit chamber 30. Disposed in front of the frontal end wall 4 is a further reversing chamber 29 which interconnects the tubes 15 and 15' of the second and third stages.

Air supply tubes extend parallel to the firing chamber 1 on the external side thereof. The air supply tubes 2 communicate with radial branch tubes 2' which supply combustion air to the tangential nozzles 3 which pass through the inner wall. The nozzles 3 are arranged in the wave grooves of the combustion chamber wall 1 and do not protrude above the wave crests. The air supply tubes 2 extend in front of the frontal end plate 4 from a ring-shaped manifold 6 which is connected through a tube line 6' with a fan 7 for propelling the combustion air. At the rear end the air supply tubes 2 are closed by stoppers 8 in the rear end wall which permits inspecting and cleaning the air supply tubes.

The outlet opening 9 for the smoke gases has a smaller diameter than the firing chamber 1 and can be made of concrete or refractory bricks.

This outlet opening 9 may somewhat protrude into the firing chamber 1 and may be additionally cooled by water tubes. The ash and any remaining solid fuel particles that may pass through the outlet 10 into the reversing chamber 11 can be removed from the chamber 11 through a manhole.

In addition, the device may be provided with channels in the frontal wall 5 win the region adjacent to the outlet opening 9. These additional channels then afford blowing tertiary air into the firing chamber 1 through nozzles 17, thus affording a further improvement with respect to the combustion of the fuel materials. Furthermore, axial air which returns in counterflow can be introduced through the nozzles 18, which promotes a return of those particles into the frontal combustion zones that are not yet fully combusted and consequently rotate in the zone of the axial zero component of the speed. The burner nozzle proper 22 of refractory material is arranged in the frontal end wall 15. The nozzle 22 is connected with the ring-shaped manifold 6 through air flaps 21 designed as guiding vanes and through a diaphragm 20. From manifold 6 the nozzle 22 is supplied with combustion air. Admission to the burner and cleaning is afforded through a cooled door 23. Inspection and ignition openings 25 and 26 of conventional type are further provided in the end wall 19.

Figure 1:
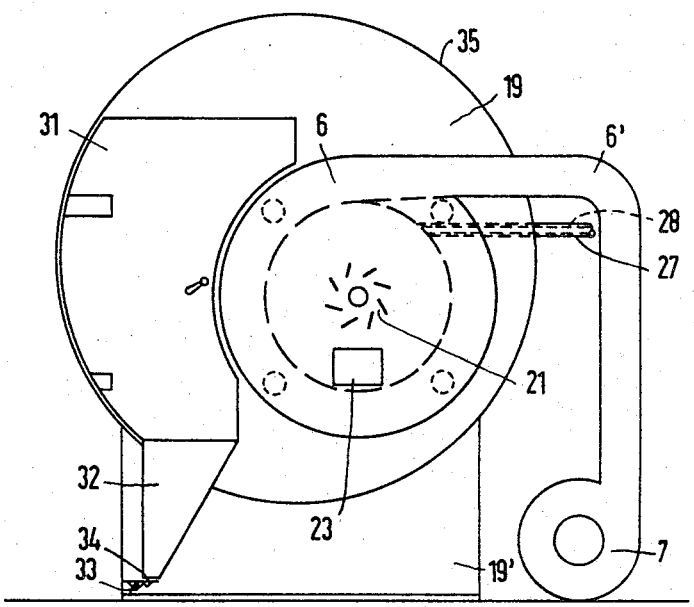
FIG. 1 is a front view of a smoke-gas boiler.
Figure 3:
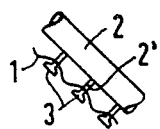
FIG. 3 is a partial cross section along the line III—III in FIG. 2.
Figure 2:
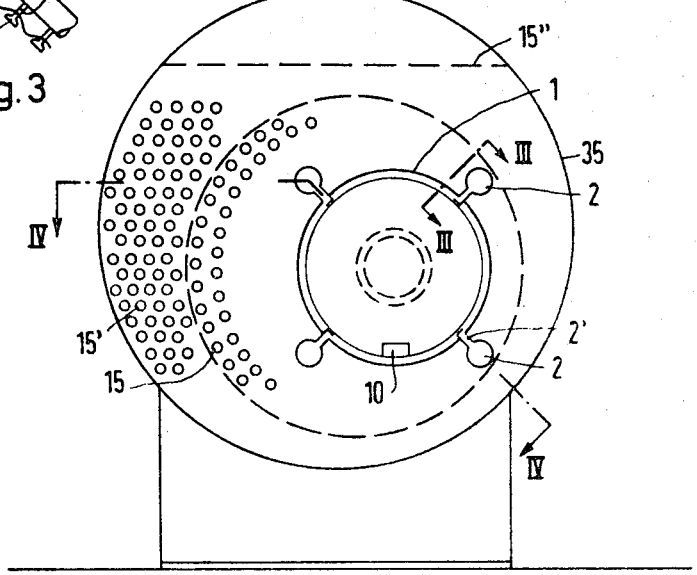
FIG. 2 is a cross section parallel to the plane of FIG. 1 and extending approximately in the middle of the axial length of a firing chamber.

If the described firing chamber is to combust pulverulent solid fuel materials which can be kept floating in the air current primarily blown into the firing chamber, then it is advisable according to FIG. 1 to provide a supply line 27 in tangential relation to the firing chamber 1. This line passes through the outer boiler wall 35 to the outside and can be lined on the inside with a metal lining 28 possessing a high resistance to abrasion. The chamber 29 between the second and the third stage, as well as the gas outlet 30, are equipped with doors for easy access and for the provision of ash collecting funnels 31 and 32 in which the ash, due to the change in direction by 180° or 90° will readily settle down. These ash collecting funnels are equipped with rack sliders 33, 34 which secure an easy opening and good air tightness for a satisfactory removal of the fine residues and the solid fuels.

The performance of the firing chamber according to the invention is as follows.

As soon as the fuel, in gaseous, liquid or fine-granular form, is brought into the firing chamber 1 through the tangential opening 27 according to FIG. 1, the fan 7 being in operation, the known tornado-flow combustion operation is initiated. The fan 7 supplies through the tube line 6' air under pressure to the ring-shaped manifold 6 through which the air is passed into the air guiding tube 2, then passing through the secondary tubes 2' and tangentially out of the nozzles 3 between the wave rings of the fuel chamber winding into the fuel chamber proper. By virtue of the resulting form of flow, the fuel is much better utilized than if it would be blown only through the atomizer 27 into the fuel nozzle 26. The other functioning, commencing at the moment at which the combustion gases pass through the outlet opening 9 in the rear end wall 4, is the same as with the conventional smoke tube boilers, except with the difference that any resulting ash may become deposited neither in the burning chamber 1 nor in the tubes 15 and 15', due to the high flow speed of the gases and the particles kept in suspension. The ash rather collects in the reversing chambers 11 and 29 as well as in the outlet chamber 30 from which it can readily be drawn off because the lower portion of these chambers is designed in the shape of funnels 32. In the event of a relatively large occurrence of ash deposits, the mentioned funnels can be substituted by corresponding devices which for example comprise cooled discharging worm drives, as well as rotating sliders which are preferably arranged in the reversing chamber 11 and are located beneath the closure of the cleaning door 12 opposite the plug 8.

Consequently, the described firing chamber according to the invention makes it possible to secure a high efficiency even with boilers of small power output, and further secures that the fuels will be completely burned out and that the temperature distribution along the fuel chamber wall will have a uniform course. In addition, there results a particularly small integrated design with simultaneously radiating and convective absorption of the liberated heat, in contrast to conventional systems in which separate flues for radiating and convective absorption are provided and which demand a considerably larger overall space.

To those skilled in the art it will be obvious upon a study of this disclosure that firing chambers according to my invention may be modified in various respects and may be given designs other than illustrated and described herein, without departing from the essential features of my invention and within the scope of the claims annexed hereto.

I claim:

1. A firing chamber structure having a substantially cylindrical combustion chamber for combustion of gaseous, liquid or fine-granular fuel, for use in steam generators and the like, comprising means on one axial end of said chamber for the supply of fuel and the supply of a partial combustion-air quantity whereby a tornado flow is maintained in said chamber, a waste-gas outlet in the opposite end of said chamber for discharging waste gas under utilization of forces occurring in the tornado flow, said chamber having an inner wall of wavy configuration in the axial direction with respective waves extending transverse to said direction, and nozzles tangentially arranged in the wave valleys for supplying further combustion air, said nozzles having respective nozzle outlets disposed in the vicinity of said respective wave valleys and terminating at most at the height of the wave crests.

2. In a firing chamber, said waves of the inner-wall configuration forming at least one continuous helical turn.

3. A firing chamber structure according to claim 1, comprising a ring-shaped manifold for combustion air extending substantially concentrically to said cylindrical combustion chamber about said one end thereof, said partial air quantity supply means comprising a plurality of air injection nozzles, and respective connecting lines connecting said injection nozzles with said manifold, said connecting lines extending substantially parallel to the chamber axis on the outside of said chamber.

4. In a firing chamber structure according to claim 1, comprising a burner at said one end of said chamber for burning fuel and combustion air, and a supply line for solid fuel tangentially entering into said chamber in proximity of said burner.

5. A firing chamber structure according to claim 1, comprising air supply nozzles entering into said chamber through said other axial end thereof and being arranged in concentric relation to said waste-gas outlet.

6. A firing chamber structure according to claim 1 forming part of a steam generator with substantially horizontal smoke gas tubes, a cylindrical water pressure boiler eccentrically surrounding said chamber, a smoke-gas direction changer connected to the waste-gas outlet of said chamber, a second boiler stage having smoke gas tubes starting and supplied from said direction changer and extending along the substantially entire length of the boiler, and another gas-flow direction changer on the burner side of said chamber, a third stage of the boiler comprising further smoke gas tubes extending from said other direction changer to receive therefrom smoke gas after it has passed through said second stage, and a waste-gas outlet at the end of said third stage.

7. In a firing chamber structure according to claim 7, said combustion-air supply means comprising air lines extending inside said boiler, and cooling means surrounding said latter air supply lines and containing cooling water around said latter lines.

* * * * *